US011419051B1

(12) United States Patent
Nath et al.

(10) Patent No.: US 11,419,051 B1
(45) Date of Patent: Aug. 16, 2022

(54) POWER SAVING THROUGH DISCONTINUOUS RECEPTION (DRX) IN MULTI-SIM USER EQUIPMENT (UE)

(71) Applicant: QUALCOMM Incorporated, San Diego, CA (US)

(72) Inventors: Sudeepta Kumar Nath, Sambalpur (IN); Ashok Kumar Tripathi, Pragathi Enclave (IN); Anil Kumar Devpura, Hyderabad (IN); Tushar Singh, Hyderabad (IN); Gagana Sindhu Sabbavarapu, Visakhapatnam (IN); Sowmya Penta, Srikakulam (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/183,266

(22) Filed: Feb. 23, 2021

(51) Int. Cl.
*H04W 48/16* (2009.01)
*H04W 52/02* (2009.01)
*H04W 88/06* (2009.01)
*H04W 8/18* (2009.01)
*H04W 76/28* (2018.01)

(52) U.S. Cl.
CPC ....... *H04W 52/0216* (2013.01); *H04W 8/183* (2013.01); *H04W 76/28* (2018.02); *H04W 88/06* (2013.01)

(58) Field of Classification Search
None
See application file for complete search history.

(56) References Cited

FOREIGN PATENT DOCUMENTS

DE 102015203168 B4 * 2/2020 ........ H04W 36/0022

* cited by examiner

*Primary Examiner* — Gary Lafontant
(74) *Attorney, Agent, or Firm* — Patterson & Sheridan, LLP

(57) ABSTRACT

Certain aspects of the present disclosure provide techniques for power saving through discontinuous reception (DRX) in multiple subscriber identity module (multi-SIM) user equipment (UE). A method that may be performed by a UE includes determining a first DRX configuration associated with a first SIM and a second DRX configuration associated with a second SIM are asynchronous, generating, based on the first DRX configuration and the second DRX configuration, a synchronous DRX configuration for communicating with the first SIM and the second SIM, transmitting, to a first base station (BS) associated with the first SIM and to a second BS associated with the second SIM, an indication of the synchronous DRX configuration, and communicating with the first BS using the first SIM and the second BS using the second SIM in accordance with the synchronous DRX configuration.

28 Claims, 16 Drawing Sheets

```
DRX-Preference-r16 ::=
SEQUENCE {
    preferredDRX-InactivityTimer-r16
    preferredDRX-ON-Timer
    preferredDRX-LongCycle-r16
    preferredDRX-ShortCycle-r16
    preferredDRX-ShortCycleTimer-r16
}
```

FIG. 7

POWER SAVING THROUGH DISCONTINUOUS RECEPTION (DRX) IN MULTI-SIM USER EQUIPMENT (UE)

BACKGROUND

Field of the Disclosure

Aspects of the present disclosure relate to wireless communications, and more particularly, to techniques for power saving through discontinuous reception (DRX) in a multiple subscriber identity module (multi-SIM) user equipment (UE).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved power saving through discontinuous reception (DRX) in a multiple subscriber identity module (multi-SIM) user equipment (UE)

Certain aspects of the subject matter described in this disclosure can be implemented in a method for wireless communication by a UE. The method generally includes determining a first DRX configuration associated with a first SIM and a second DRX configuration associated with a second SIM are asynchronous, generating, based on the first DRX configuration and the second DRX configuration, a synchronous DRX configuration for communicating with the first SIM and the second SIM, transmitting, to a first base station (BS) associated with the first SIM and to a second BS associated with the second SIM, an indication of the synchronous DRX configuration, and communicating with the first BS using the first SIM and the second BS using the second SIM in accordance with the synchronous DRX configuration.

Certain aspects of the subject matter described in this disclosure can be implemented in a method for wireless communication by a BS of a first network. The method generally includes receiving, from a multi-SIM UE, an indication of a synchronous DRX configuration for the first network and a second network, and communicating with the UE in accordance with the synchronous DRX configuration.

Certain aspects of the subject matter described in this disclosure can be implemented in a method for wireless communication by a first BS of a first network. The method generally includes determining a first DRX configuration associated with the first BS is asynchronous with a second DRX configuration associated with a second BS of a second network, in response to determining the first DRX configuration is asynchronous with the second DRX configuration, generating a synchronous DRX configuration for the first BS and the second BS, transmitting the synchronous DRX configuration to a multi-SIM UE, and communicating with the multi-SIM UE in accordance with the transmitted synchronous DRX configuration.

Certain aspects of the subject matter described in this disclosure can be implemented in an apparatus for wireless communication by a multi-SIM UE. The apparatus generally includes at least one processor, and a memory coupled to the at least one processor, the memory comprising code executable by the at least one processor to cause the UE to determine a first DRX configuration associated with a first SIM and a second DRX configuration associated with a second SIM are asynchronous, generate, based on the first DRX configuration and the second DRX configuration, a synchronous DRX configuration for communicating with the first SIM and the second SIM, transmit, to a first BS associated with the first SIM and to a second BS associated with the second SIM, an indication of the synchronous DRX configuration, and communicate with the first BS using the first SIM and the second BS using the second SIM in accordance with the synchronous DRX configuration.

Certain aspects of the subject matter described in this disclosure can be implemented in an apparatus for wireless communication by a BS of a first network. The apparatus generally includes at least one processor, and a memory coupled to the at least one processor, the memory comprising code executable by the at least one processor to cause the BS to receive, from a multi-SIM UE, an indication of a synchronous DRX configuration for the first network and a second network, and communicate with the UE in accordance with the synchronous DRX configuration.

Certain aspects of the subject matter described in this disclosure can be implemented in an apparatus for wireless communication by a BS of a first network. The apparatus generally includes at least one processor, and a memory coupled to the at least one processor, the memory comprising code executable by the at least one processor to cause the BS to determine a first DRX configuration associated with the first BS is asynchronous with a second DRX configuration associated with a second BS of a second network, in response to determining the first DRX configuration is asynchronous with the second DRX configuration, generate a synchronous DRX configuration for the first BS and the second BS, transmit the synchronous DRX configuration to a multi-SIM UE, and communicate with the multi-SIM UE in accordance with the transmitted synchronous DRX configuration.

Certain aspects of the subject matter described in this disclosure can be implemented in an apparatus for wireless communication by a multi-SIM UE. The UE generally includes means for determining a first DRX configuration associated with a first SIM and a second DRX configuration associated with a second SIM are asynchronous, means for generating, based on the first DRX configuration and the second DRX configuration, a synchronous DRX configuration for communicating with the first SIM and the second SIM, means for transmitting, to a first BS associated with the first SIM and to a second BS associated with the second SIM, an indication of the synchronous DRX configuration, and means for communicating with the first BS using the first SIM and the second BS using the second SIM in accordance with the synchronous DRX configuration.

Certain aspects of the subject matter described in this disclosure can be implemented in an apparatus for wireless communication by a BS of a first network. The BS generally includes means for receiving, from a multi-SIM UE, an indication of a synchronous DRX configuration for the first network and a second network, and means for communicating with the UE in accordance with the synchronous DRX configuration.

Certain aspects of the subject matter described in this disclosure can be implemented in an apparatus for wireless communication by a BS of a first network. The BS generally includes means for determining a first DRX configuration associated with the first BS is asynchronous with a second DRX configuration associated with a second BS of a second network, in response to determining the first DRX configuration is asynchronous with the second DRX configuration, means for generating a synchronous DRX configuration for the first BS and the second BS, means for transmitting the synchronous DRX configuration to a multi-SIM UE, and means for communicating with the multi-SIM UE in accordance with the transmitted synchronous DRX configuration.

Certain aspects of the subject matter described in this disclosure can be implemented in a computer readable medium storing computer executable code thereon for wireless communication by a multi-SIM UE. The computer readable medium generally includes code for determining a first DRX configuration associated with a first SIM and a second DRX configuration associated with a second SIM are asynchronous, code for generating, based on the first DRX configuration and the second DRX configuration, a synchronous DRX configuration for communicating with the first SIM and the second SIM, code for transmitting, to a first BS associated with the first SIM and to a second BS associated with the second SIM, an indication of the synchronous DRX configuration, and code for communicating with the first BS using the first SIM and the second BS using the second SIM in accordance with the synchronous DRX configuration.

Certain aspects of the subject matter described in this disclosure can be implemented in a computer readable medium storing computer executable code thereon for wireless communication by a BS of a first network. The computer readable medium generally includes code for receiving, from a multi-SIM UE, an indication of a synchronous DRX configuration for the first network and a second network, and code for communicating with the UE in accordance with the synchronous DRX configuration.

Certain aspects of the subject matter described in this disclosure can be implemented in a computer readable medium storing computer executable code thereon for wireless communication by a BS of a first network. The computer readable medium generally includes code for determining a first DRX configuration associated with the first BS is asynchronous with a second DRX configuration associated with a second BS of a second network, in response to determining the first DRX configuration is asynchronous with the second DRX configuration, code for generating a synchronous DRX configuration for the first BS and the second BS, code for transmitting the synchronous DRX configuration to a multi-SIM UE, and code for communicating with the multi-SIM UE in accordance with the transmitted synchronous DRX configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7 illustrates an example of DRX information used to signal DRX indication information.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
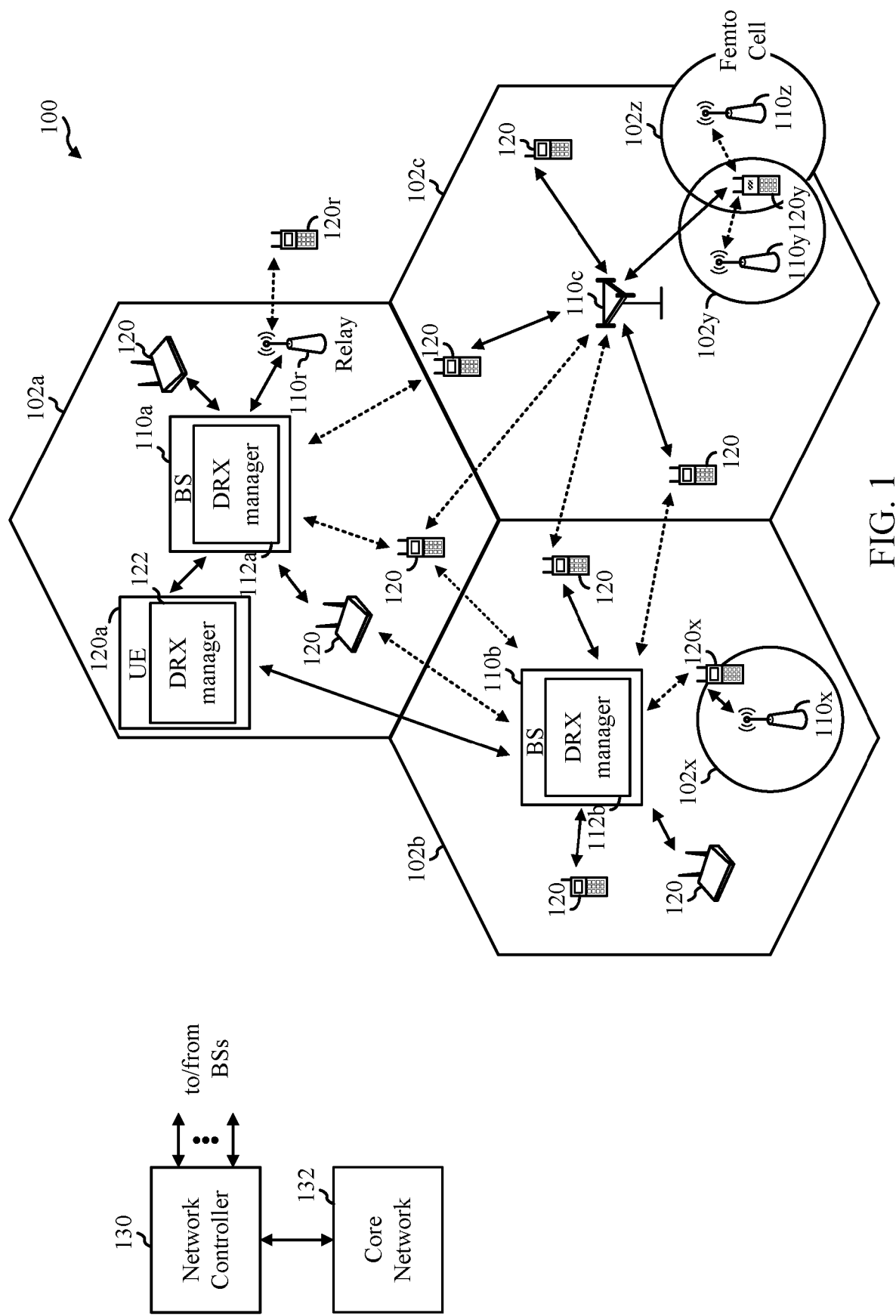
FIG. 1 is a block diagram conceptually illustrating an example wireless communication network, in accordance with certain aspects of the present disclosure.

Aspects of the present disclosure provide apparatus, methods, processing systems, and computer readable mediums for conserving power in a multiple subscriber identity module (multi-SIM) user equipment (UE).

In 5G new radio (NR), base stations (BSs) rely on UEs to gather information regarding neighboring cells to facilitate automatic neighbor detection procedures. Where UEs operate using more than one SIM, a UE may gather information from neighboring cells for each SIM carrier. In this multi-SIM scenario, UE may need to enact certain power saving procedures to better monitor carrier information gathered by each SIM.

A single SIM UE may utilize a discontinuous reception (DRX) configuration to save power. A DRX configuration may allow the UE to connect to a BS during certain "on" intervals defined by the DRX configuration; to save power, a UE may disconnect from a BS during "off" intervals and sit idle for a time defined by the DRX configuration. The DRX configuration may be defined by the UE or by a BS.

In a multi-SIM UE scenario, each SIM may have a different DRX configuration, wherein the "on" and "off" intervals are asynchronous. For example, where a DRX configuration for a first SIM may define an "off" interval, a DRX configuration for a second SIM may define a concurrent "on" interval. As a result, a multi-SIM UE may disconnect from a (first) BS associated with a first SIM, but may not disconnect from a (second) BS associated with a second SIM. Therefore, a UE utilizing multiple SIMS having asynchronous DRX configurations may not become fully idle which hinders the UE's power saving abilities.

In an effort to save UE power, and as described in more detail herein, a UE or BS may enact procedures to synchronize all DRX configurations engaged by a multi-SIM UE to restore power saving function and facilitate automatic neighbour detection procedures.

The following description provides examples of power saving through discontinuous reception (DRX) in a multiple subscriber identity module (multi-SIM) user equipment (UE) in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured for DRX management. The UE 120 is a multi-SIM UE. As shown in FIG. 1, the BS 110a and BS 110b each includes a DRX manager 112a, and 112b for power saving through DRX in multi-SIM UEs, in accordance with aspects of the present disclosure. The multi-SIM UE 120a communicates with both BS 110a and BS 110b. The UE 120a includes a DRX manager 122 for power saving through DRX, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
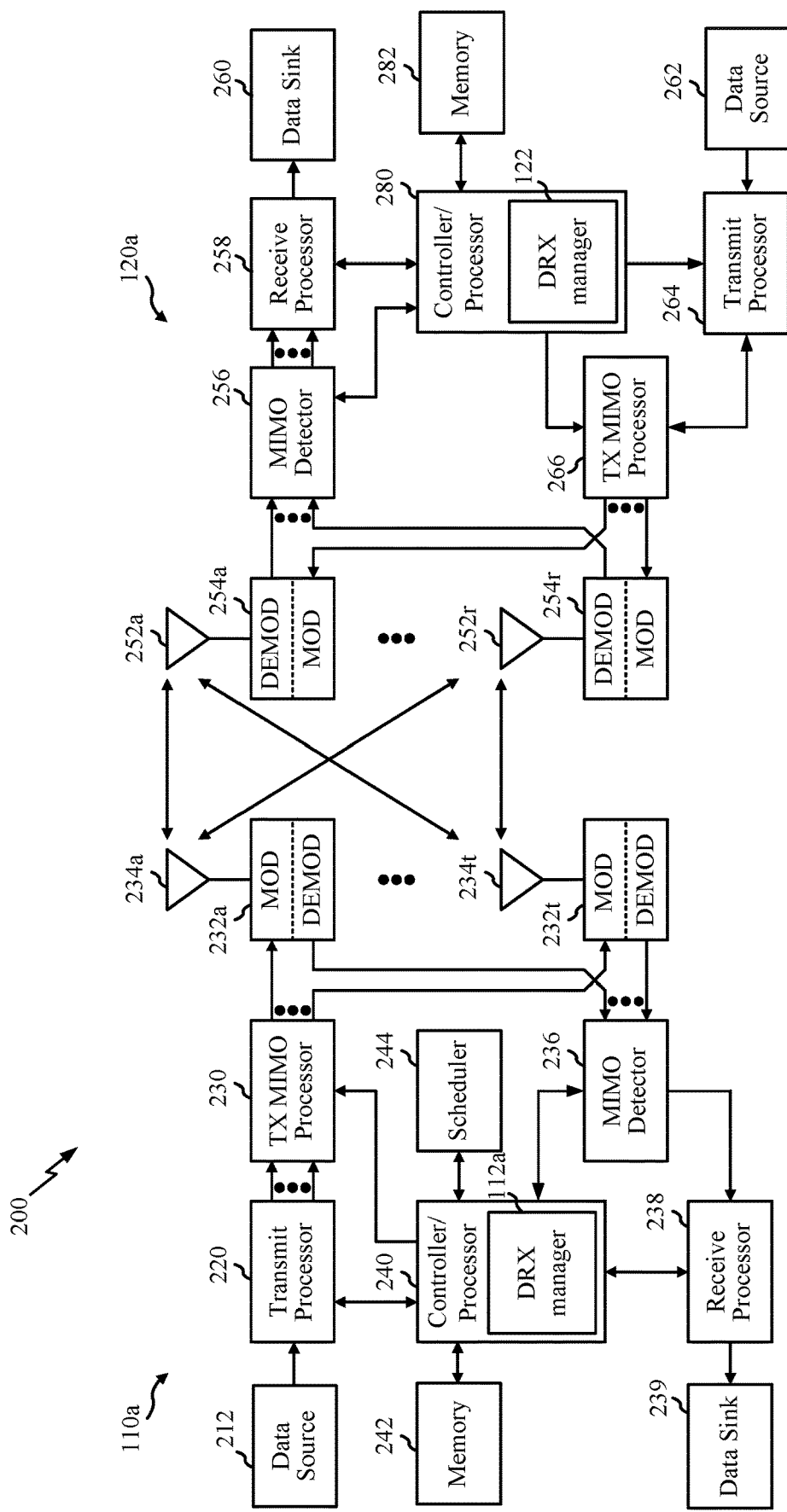
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an DRX manager 112a for power saving through DRX in multi-SIM UEs, according to aspects described herein. As shown in FIG. 2, the controller/processor 280 of the UE 120a has an DRX manager 122 for power saving through DRX in multi-SIM UEs, according to aspects described herein. Although shown at the controller/processor, other components of the UE 120a and BS 110a may be used to perform the operations described herein. The UE 120a may also communicate with a BS 110b (including similar components as BS 110a as shown in FIG. 1 and not show in FIG. 2) to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
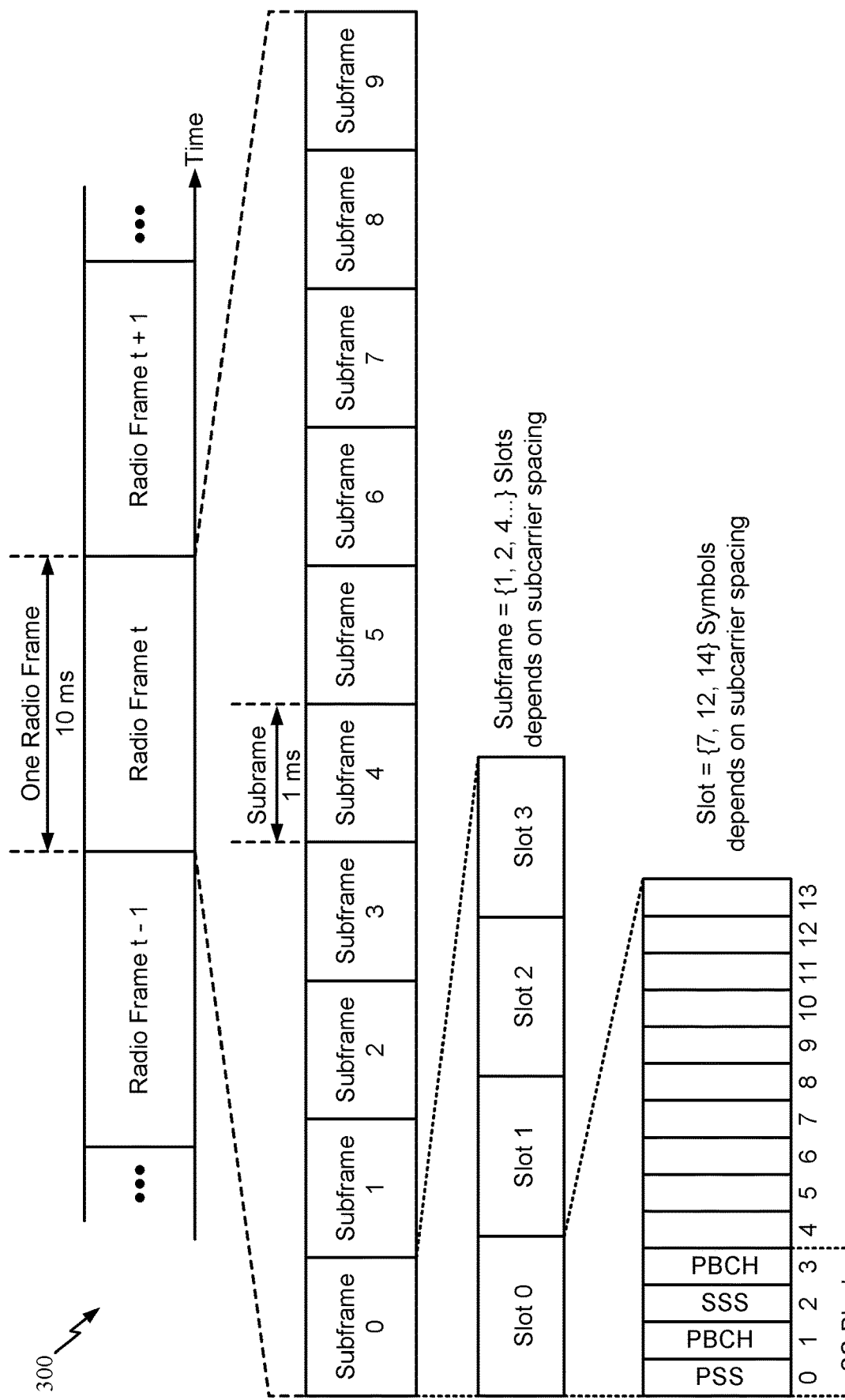
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Power saving is an important feature in wireless communication. In 4G LTE and 5G NR, a UE may utilize a DRX configuration to save power while PDCCH monitoring in the RRC connected mode. When DRX is configured, the UE does not have to continuously monitor PDCCH. A DRX configuration may be defined according to the following parameters: on-duration, inactivity-timer, retransmission-timer, cycle, and active-time.

Figure 4:
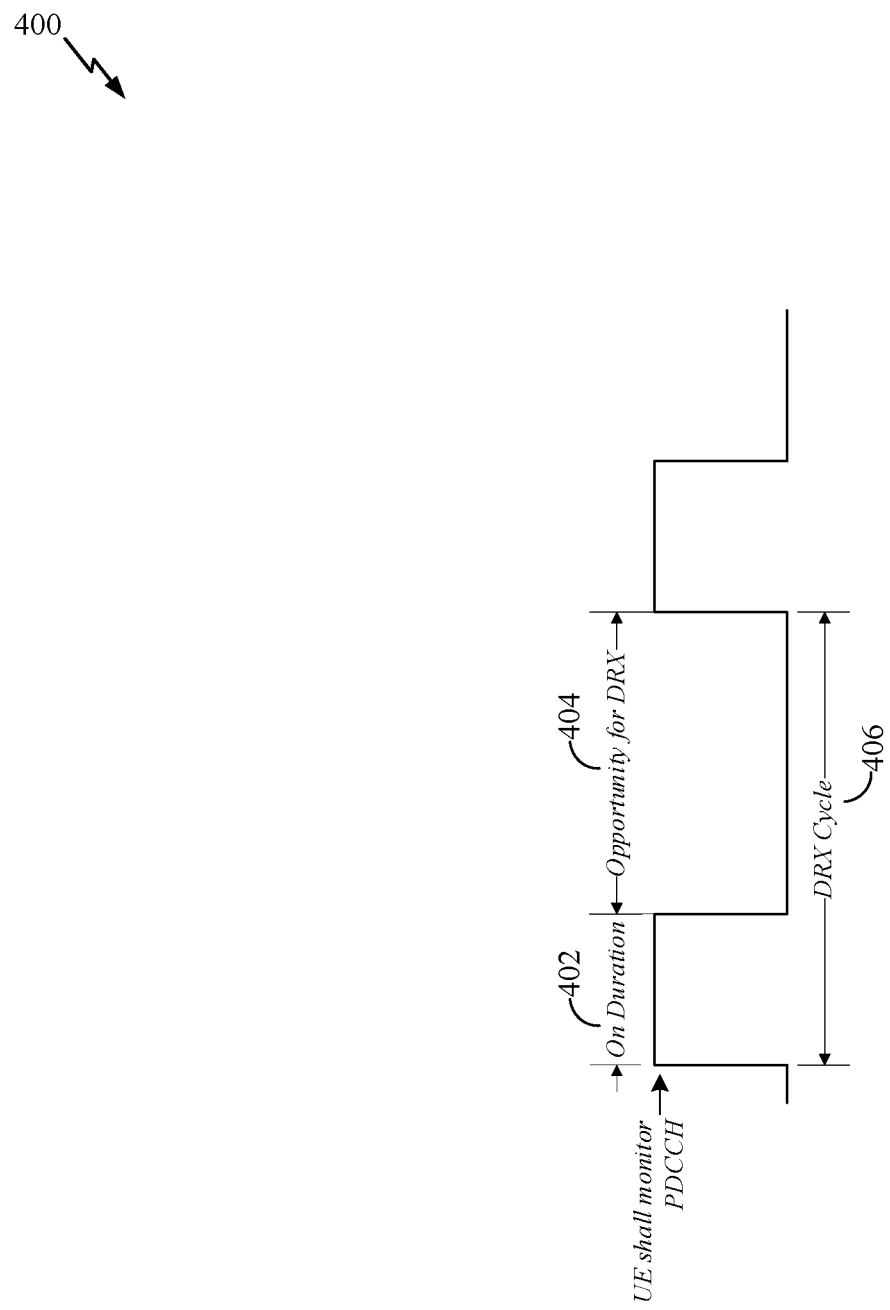
FIG. 4 is a timeline illustrating UE physical downlink control channel (PDCCH) monitoring during discontinuous reception (DRX) procedures.

The on-duration is the duration that the UE waits, after waking up, to receive PDCCHs. If the UE successfully decodes a PDCCH, the UE stays awake and starts the inactivity timer. FIG. 4 illustrates the on-duration 402 during with the UE monitors for PDCCH.

The inactivity-timer is duration that the UE waits to successfully decode a PDCCH, from the last successful decoding of a PDCCH. The UE may restart the inactivity timer following a single successful decoding of a PDCCH.

The retransmission-timer is the length of time until a retransmission can be expected.

The cycle is a specified periodic repetition of the on-duration followed by a possible period of inactivity. FIG. 4 illustrates a DRX cycle 400.

The active-time is a total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

FIG. 4 illustrates a timeline 400 of UE's DRX configuration. The DRX configuration may delineate an "on" interval 402 defined by the on-duration followed by an "off" interval 404 in accordance with the parameters above. During the "on" interval 402, the UE may monitor for PDCCH. During the "off" interval 404, the UE remains idle. If a BS transmits a signal to the UE during the "on" interval 402, the UE may communicate with the BS. If a BS transmits a signal to the UE during the "off" interval 404, the UE will not respond. This configuration allows the UE to save battery power.

In some cases, a UE may have more than one SIM used for wireless communication, where each SIM independently communicates with a separate BS. In this multi-SIM UE scenario, each SIM may have a different DRX configuration, wherein the "on" and "off" intervals are asynchronous.

Figure 5:
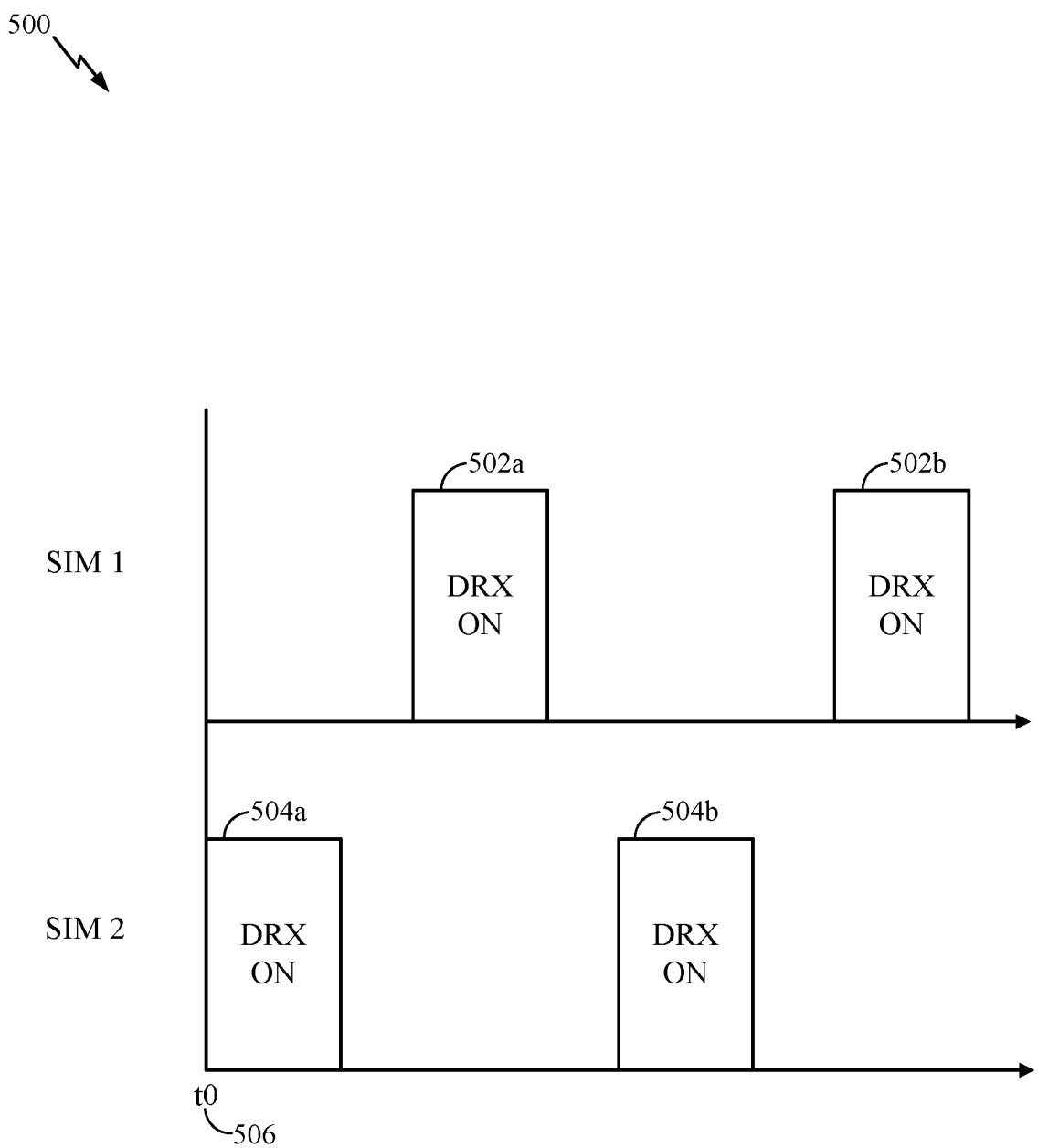
FIG. 5 is a timeline illustrating example asynchronous DRX at a multiple subscribe identity module (multi-SIM) UE, in accordance with certain aspects of the present disclosure.

FIG. 5 is a timeline 500 illustrating network connectivity for a UE with two SIMS, where the DRX configurations for the two SIMs are asynchronous. At SIM 1, the DRX configuration may define an "off" interval at some point in time 506, prior to an "on" interval 502a. At the same point in time 506, a DRX configuration for SIM 2 may define an "on" interval 504a. As a result, a multi-SIM UE may disconnect from a BS associated with SIM 1, but may not disconnect from a BS associated with SIM 2. This may repeat as "on" intervals for SIM 1 502b and "on" intervals for SIM 2 504b are triggered asynchronously until one or both SIMs undergo handover, or until the UE is powered down. A multi-SIM UE having asynchronous DRX configurations as illustrated in FIG. 5 may not become fully idle, hindering power saving function.

In the current state of the art, a UE remains available for wireless communication according to the asynchronous DRX configurations of each SIM. The network sends a DRX configuration for each SIM, and the UE may not alter the parameters of the configuration.

Accordingly, what is needed are techniques and apparatus for synchronizing DRX configurations to allow power saving through DRX at a multi-SIM UE.

Example Power Saving Through DRX in a Multi-SIM UE

Aspects of the present disclosure provide techniques and apparatus for synchronizing DRX configurations in a multi-SIM UE, such that each SIM may use the same "on" and "off" intervals.

Figure 6:
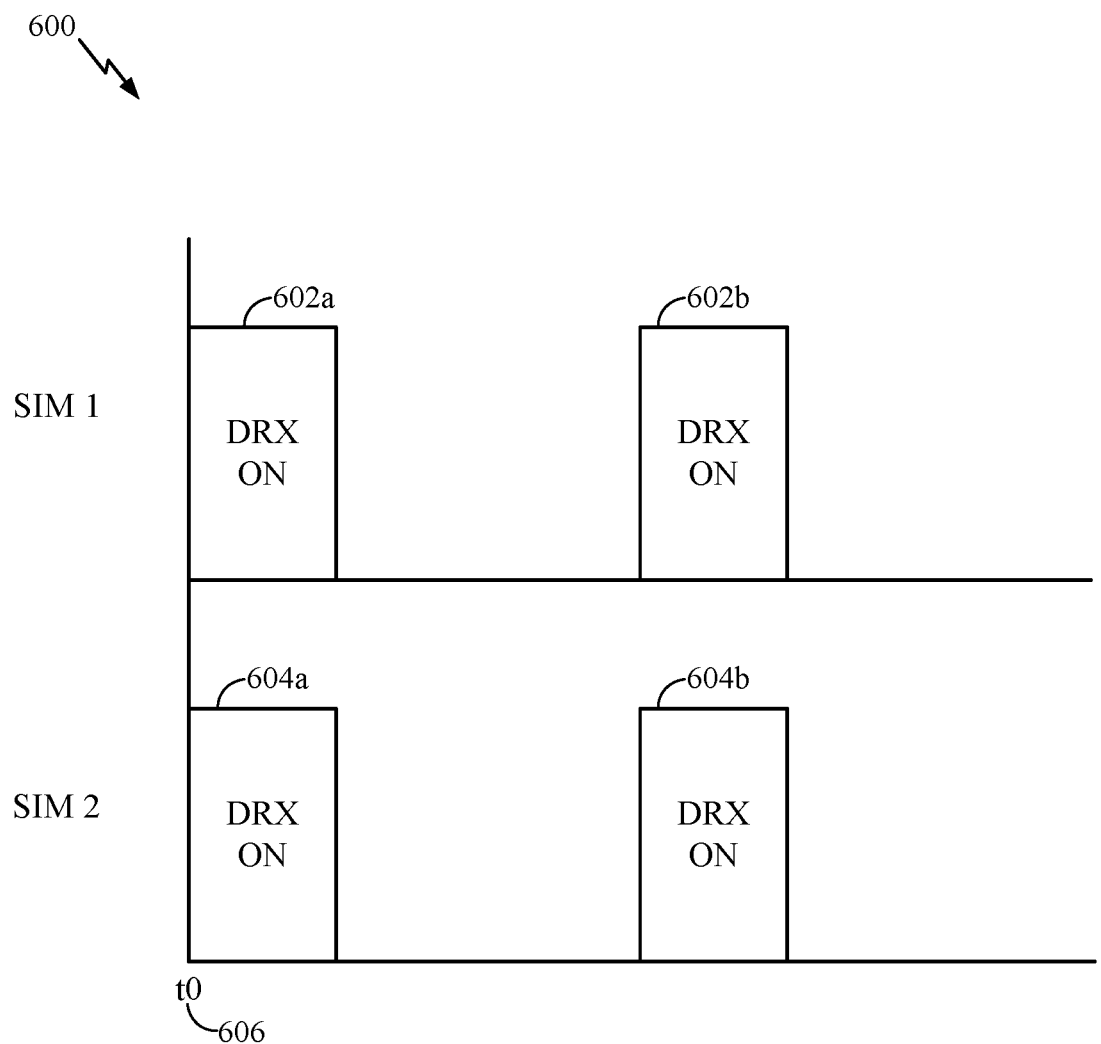
FIG. 6 is a timeline illustrating example synchronous DRX at a multi-SIM UE, in accordance with certain aspects of the present disclosure.

FIG. 6 is a timeline 600 illustrating network connectivity for a UE with two SIMs, where the DRX configurations for the two SIMs are synchronous in a way to enable power saving procedures. At a certain point in time 606, a DRX configuration associated with SIM 1 triggers an "on" interval 602a, allowing SIM 1 to communicate with a BS. At the same time 606, a DRX configuration associated with SIM 2 triggers an "on" interval 604a, allowing SIM 2 to communicate with a BS. The "on" intervals 602a/604a occur at the same time, with "off" intervals in between the "on" intervals. The synchronous "on" interval repeats at 602b/604b. This allows the multi-SIM UE to save battery power by remaining idle for the full duration of "off" intervals occurring between synchronous "on" intervals (e.g., between 602a/604a and 602b/604b).

According to certain aspects of the present disclosure, a multi-SIM UE may synchronize DRX configurations for each SIM by establishing a common DRX configuration for both SIMs. In an example, the UE determines a DRX preference. After determining a DRX preference, the UE may request the DRX preference from a BS. In an example, the DRX preference is a "DRX-Preference-r16" element. The DRX preference is illustrated in FIG. 7. The DRX preference 700 includes "InactivityTimer-r16" corresponding to an inactivity timer value, an "ON-Timer" corresponding to an on-duration, a "LongCycle-r16" corresponding to an active-time, a "ShortCycle-r16" corresponding to a cycle, and a "ShortCycleTimer-r16" corresponding to a retransmission-timer.

Each SIM in a multi-SIM UE has an individual DRX configuration determined by their network. When the individual DRX configurations are asynchronous, the UE may establish a common DRX configuration. To establish a common DRX configuration, all SIMs in a multi-SIM UE communicate across an application programming interface (API) to calculate a mutual DRX preference. Once the SIMs establish the difference between their individual DRX configurations, they will define shared DRX preference parameters so that their "on" and "off" intervals are synchronous. After SIMs establish a DRX preference, the UE may transmit signaling, one or more BSs, requesting a common DRX configuration for both SIMs consistent with the DRX preference.

Figure 8:
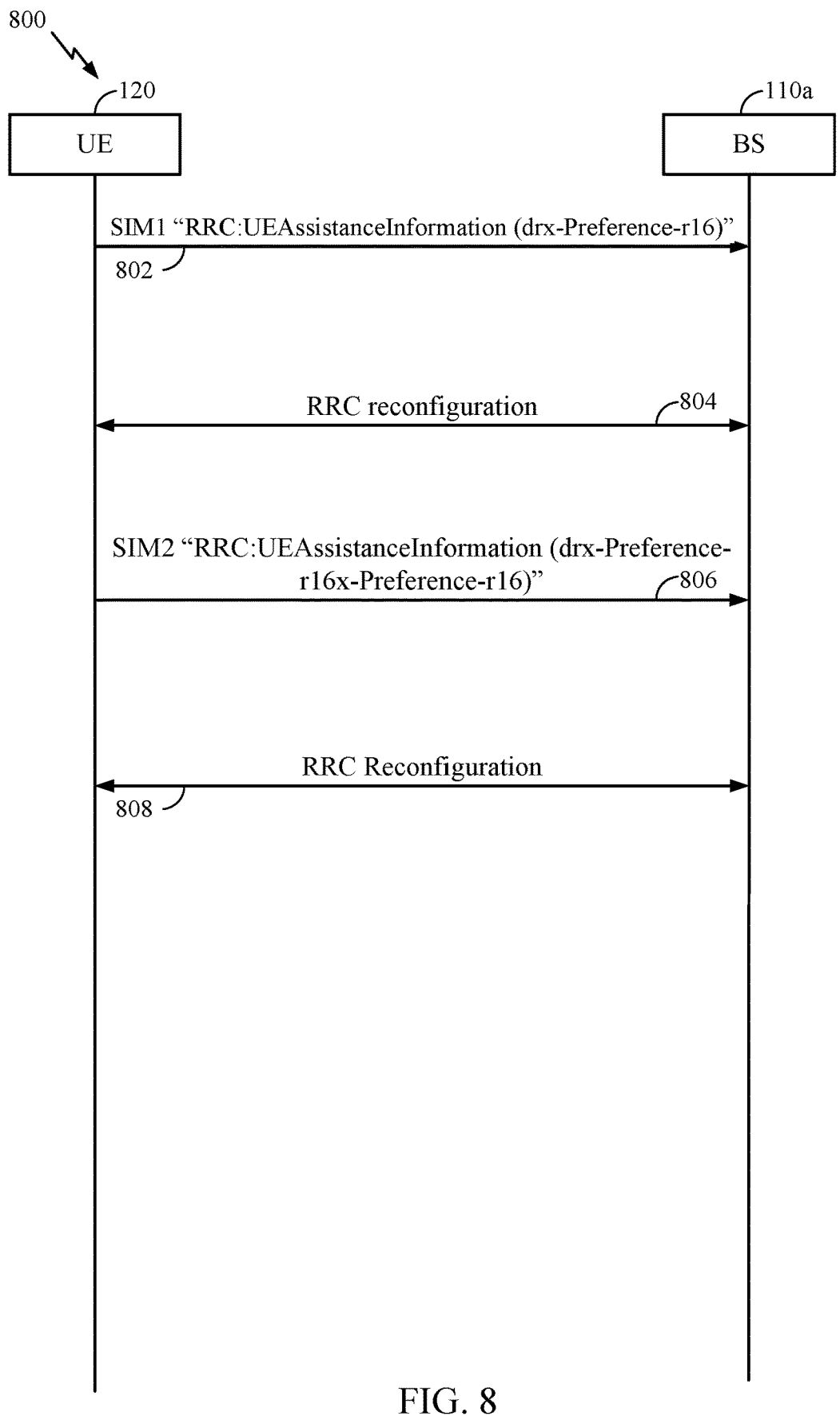
FIG. 8 is a call flow diagram illustrating example signaling for power saving through DRX for a multi-SIM UE, in accordance with aspects of the present disclosure.

FIG. 8 illustrates example signaling 800 between a UE 120 and a BS 110a in 5G NR in accordance with aspects of the present disclosure. BS 110a as illustrated in FIG. 8 may represent any BS illustrated in FIG. 1 that includes the components illustrated in FIG. 2.

After the UE establishes a DRX preference common to both SIMs, the UE 120 may transmit the UE DRX preference 802 to the BS 110a. In an example, the UE transmits a "RRC:UEAssistanceInformation (drx-Preference-r16)" 802 to BS 110a from SIM1. At 804, the BS 110a configures SIM 1 with the common DRX configuration. Then, the UE 120 may transmit the UE DRX preference 806 to the BS 110a. Again, in an example, the UE transmits a "RRC:UEAssistanceInformation (drx-Preference-r16x-Preference-r16)" 806 from SIM 2. In response, at 808, BS 110a will configure SIM2 with the common DRX configuration. At this point, the multi-SIM UE 120 will have a common DRX configuration for both SIM 1 and SIM 2. The common DRX configuration will continue in accordance with DRX preference parameters until the UE moves out of range of a BS, or until the UE is switched off.

Figure 9:
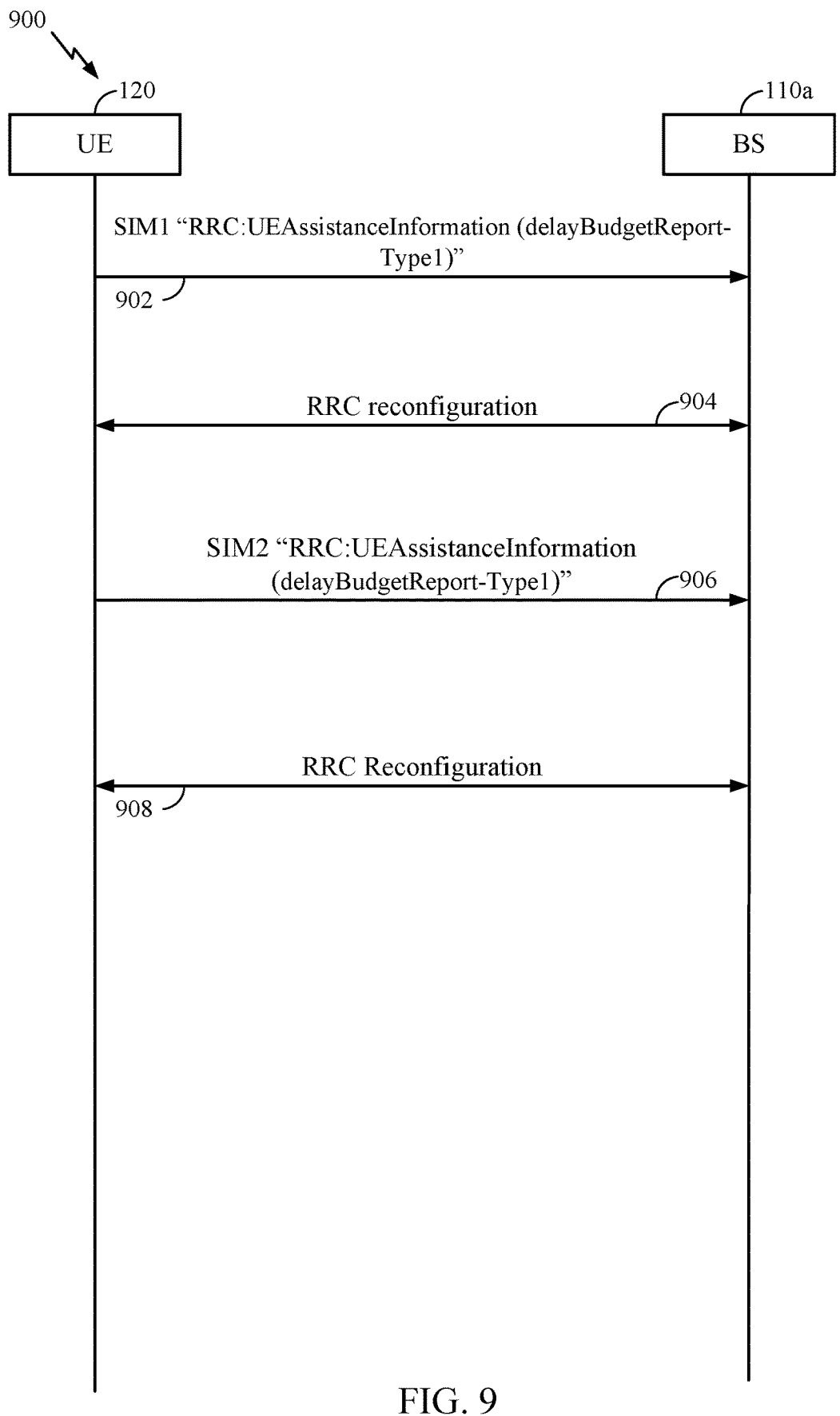
FIG. 9 is a call flow diagram illustrating example signaling for power saving through DRX in a multi-SIM UE, in accordance with aspects of the present disclosure.

FIG. 9 illustrates example signaling 900 between a UE 120 and a BS 110a in 4G LTE. BS 110a as illustrated in FIG. 9 may represent any BS illustrated in FIG. 1 that includes the components illustrated in FIG. 2.

After a UE establishes a DRX preference common to both SIMS, UE 120 transmits an indication 902 of the common DRX configuration using SIM 1 to a BS 110a. In an example, the indication 902 is an"RRC:UEAssistanceInformation (delayBudgetReport-Type1)". At 904, BS 110a configures SIM1 with the common DRX configuration. Then, UE 120 transmits an indication 906 of the common DRX configuration using SIM 2 to a BS 110a. Again, in an aspect, the indication 906 is a "RRC:UEAssistanceInformation (delayBudgetReport-Type1)" from SIM 2. In response, at 908, BS 110a configures SIM 2 with the common DRX configuration. At this point, the multi-SIM UE 120 will have a common DRX configuration for SIM 1 and SIM 2. The common DRX configuration will continue in accordance with DRX preference parameters until the UE moves out of range of a BS, or until the UE is switched off.

According to certain aspects of the present disclosure, BSs connected to a multi-SIM UE may synchronize DRX configurations at an Xn interface prior to sending the DRX configurations to the UE. In this case, a UE may not have to create a DRX preference because the BSs transmits synchronized DRX configurations to each SIM.

In 5G RN, each BS station may have an Xn interface which allows interconnected NG-RAN nodes to communicate with each other. The Xn interface is supports the exchange of signaling information between two NG-RAN nodes. This in turn supports intra-NG-RAN mobility and dual connectivity between NG-RAN nodes. When a multi-SIM UE connects to two independent BSs, the BSs may engage an Xn setup function. The Xn setup function may allow for the initial setup of an Xn interface between the two BSs, including exchange of DRX configurations for each SIM. During the BS to BS communication, a first BS may communicate the parameters of a first DRX configuration, a second BS may communicate the parameters of a second DRX configuration. At the Xn interface, the BSs determine that the first and second DRX configurations are not the same, and they may calculate a common set of DRX configuration parameters. Both BSs may then transmit the common DRX configuration to the multi-SIM UE.

Figure 10:
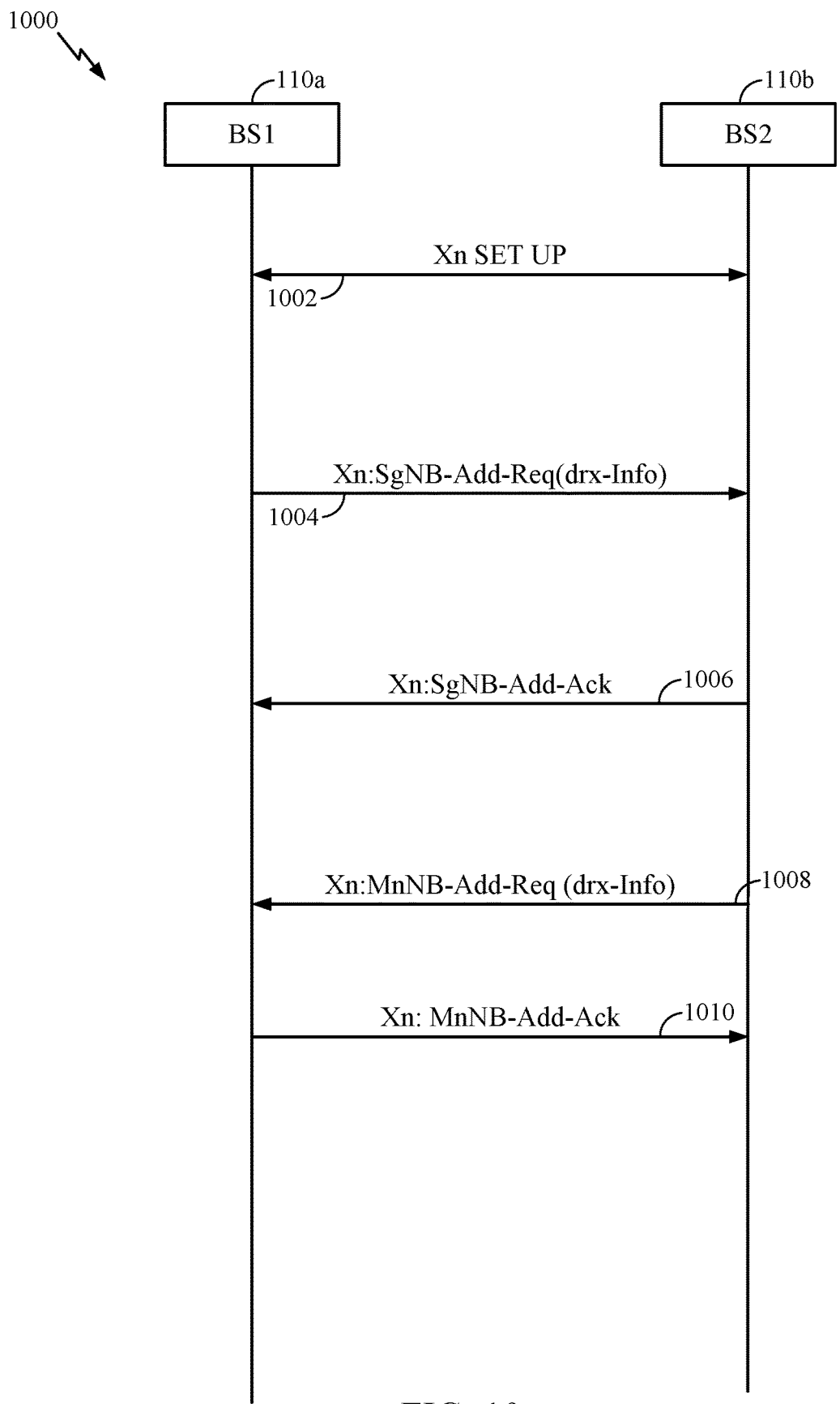
FIG. 10 is a call flow diagram illustrating example signaling by a set of BSs for power saving through DRX for a multi-SIM UE, in accordance with aspects of the present disclosure.

FIG. 10 illustrates example signaling 1000 between a BS1 110a and a BS2 110b in 5G NR in accordance with aspects of the present disclosure. After a connecting to a multi-SIM UE, BS1 and BS2 initiate an Xn SET UP 1002, creating the Xn interface. BS1 110a transmits "Xn:SgNB-Add-Req(drx-Info)" 1004 to BS2 110b, including DRX configuration information for first SIM supported by the multi-SIM UE. In response, BS2 110b transmits "Xn:SgNB-Add-Ack" 1006 to BS1 110a, acknowledging receipt. BS2 110b then transmits DRX configuration information 1008 for the second SIM supported by the multi-SIM UE to BS1 110a. BS1 transmits an acknowledgement 1010 to BS2, and both BSs compare DRX configurations for each SIM at the Xn interface. The BSs 110a/110b calculate a common, synchronous DRX configuration at the Xn interface consistent with the parameters defined above, and transmit the common DRX configuration to each SIM supported by the multi-SIM UE. The common DRX configuration will continue in accordance with DRX preference parameters until the UE moves out of range of the BS1 110a or BS2 110b, or until the UE is switched off.

Figure 11:
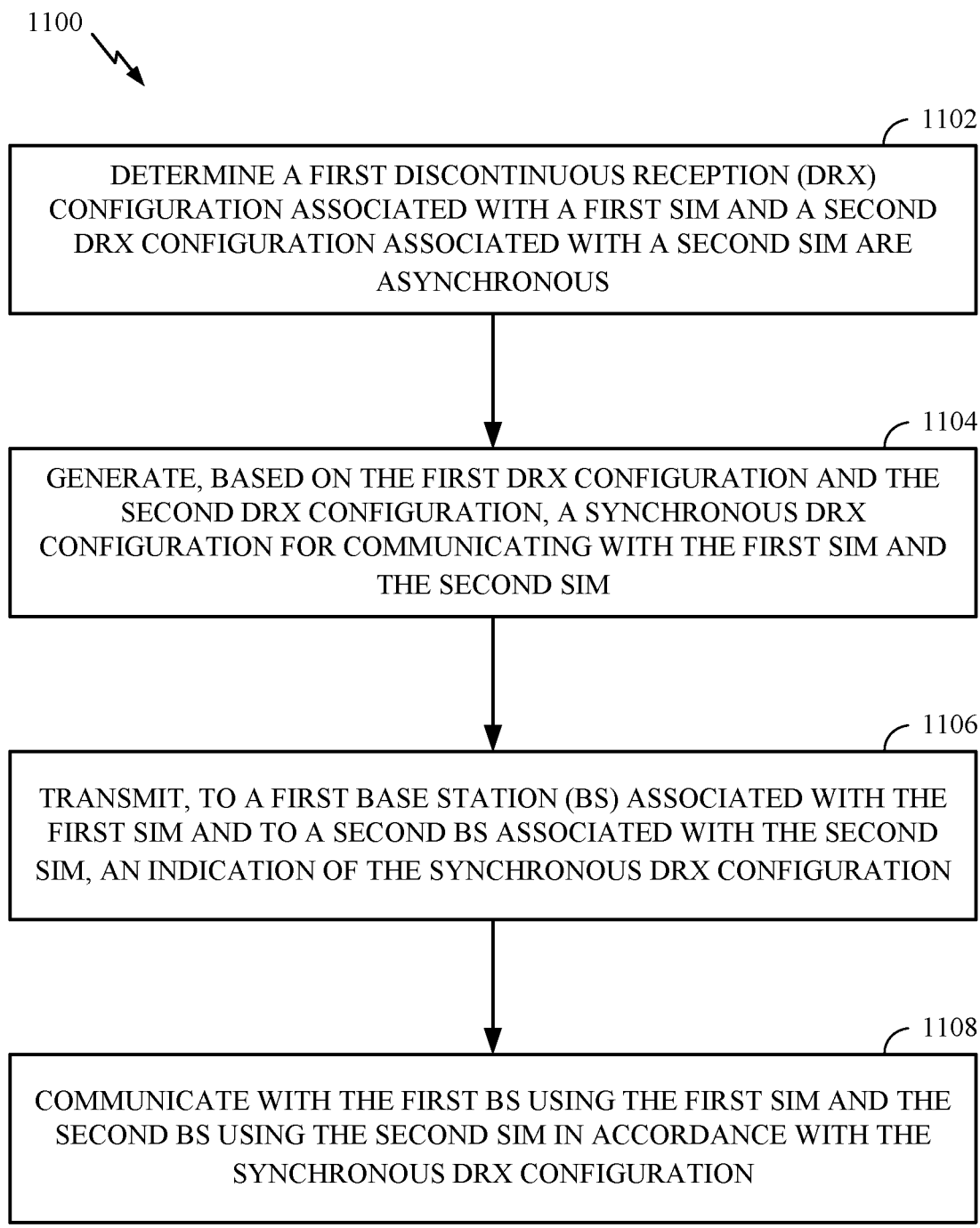
FIG. 11 is a flow diagram illustrating example operations for wireless communication by a multi-SIM UE, in accordance with certain aspects of the present disclosure.

FIG. 11 is a flow diagram illustrating example operations 1100 for wireless communication, in accordance with certain aspects of the present disclosure. The operations 1100 may be performed, for example, by a multi-SIM UE (e.g., such as the UE 120a in the wireless communication network 100). The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at 1102, by the multi-SIM UE determining a first DRX configuration associated with a first SIM and a second DRX configuration associated with a second SIM are asynchronous. The determination may be made across an API based on DRX parameters. The operations may further comprise receiving, from the first BS, the first DRX configuration, and receiving, from the second BS, the second DRX configuration. The first and second DRX parameters may correspond to a first and second SIM within the UE. The first BS may comprise one of a 5G new radio (NR) BS or a 4G BS.

At 1104, a UE generates, based on the first DRX configuration and the second DRX configuration, a synchronous DRX configuration for communicating with the first SIM and the second SIM. In some examples, the synchronous DRX configuration may comprise a same DRX-on timer and a same DRX-inactivity timer for the first SIM and the second SIM (e.g., as illustrated in FIG. 6). The synchronous DRX configuration may allow the UE to save power by maximizing the time a UE remains idle.

At 1106, a UE transmits, to a first BS associated with the first SIM and to a second BS associated with the second SIM, an indication of the synchronous DRX configuration. In some examples, the indication of the synchronous DRX configuration may comprises one or more of a DRX-inactivity timer, a DRX-ON-Timer, a DRX-LongCycle, DRX-ShortCycle, or a DRX-ShortCycleTimer as defined by DRX-Preference-r16 information illustrated in FIG. 7, consistent with DRX parameters described above. In 4G LTE, the DRX configuration may also comprise a delay budget report.

In some examples, the UE may then receive, from the first BS, a first acknowledgment of the transmitted synchronous DRX configuration, and receive, from the second BS, a second acknowledgment of the transmitted synchronous DRX configuration.

At 1108, a UE communicates with the first BS using the first SIM and the second BS using the second SIM in accordance with the synchronous DRX configuration. In some examples, the UE may terminate use of the synchronous DRX configuration when the UE powers off or hands over from one of the first or second BSs to a third BS.

Figure 12:
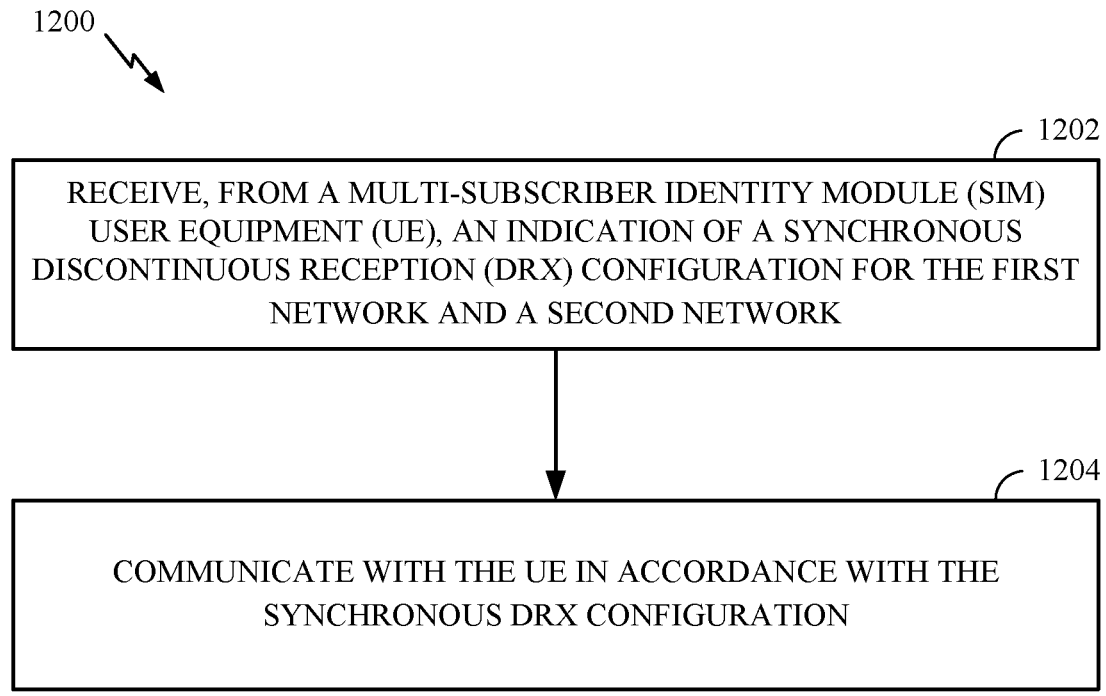
FIG. 12 is a flow diagram illustrating example operations for wireless communication by a BS, in accordance with certain aspects of the present disclosure.

FIG. 12 is a flow diagram illustrating example operations 1200 for wireless communication, in accordance with certain aspects of the present disclosure. The operations 1200 may be performed, for example, by a BS (e.g., such as the BS 110a in the wireless communication network 100). The operations 1200 may be complementary to the operations 1100 performed by the UE. The operations 1200 may be implemented as software components that are executed and run on one or more processors (e.g., controller/processor 240 of FIG. 2). Further, the transmission and reception of signals by the BS in operations 1200 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1200 may begin, at 1202, by the BS of a first network receiving, from a multi-SIM UE, an indication of a synchronous DRX configuration for the first network and a second network. The indication may be consistent with a DRX preference previously calculated by the multi-SIM UE. The synchronous DRX configuration may allow the UE to save power by maximizing the time a UE remains idle instead of monitoring a PDCCH. The BS may comprise one of a 5G new radio (NR) BS or a 4G BS.

In some examples, the BS may transmit an acknowledgement of the synchronous DRX configuration in response to receiving the indication of the synchronous DRX configuration from the UE. In some examples, the indication of the synchronous DRX configuration may comprises one or more of a DRX-inactivity timer, a DRX-ON-Timer, a DRX-LongCycle, DRX-ShortCycle, or a DRX-ShortCycleTimer as defined by DRX-Preference-r16 information illustrated in FIG. 7, consistent with DRX parameters described above. In 4G LTE, the DRX configuration may also comprise a delay budget report.

At 1204, the BS communicates with the UE in accordance with the synchronous DRX configuration. In some examples, the BS may terminate use of the synchronous DRX configuration when the UE powers off or hands over from the BS to a second B S.

Figure 13:
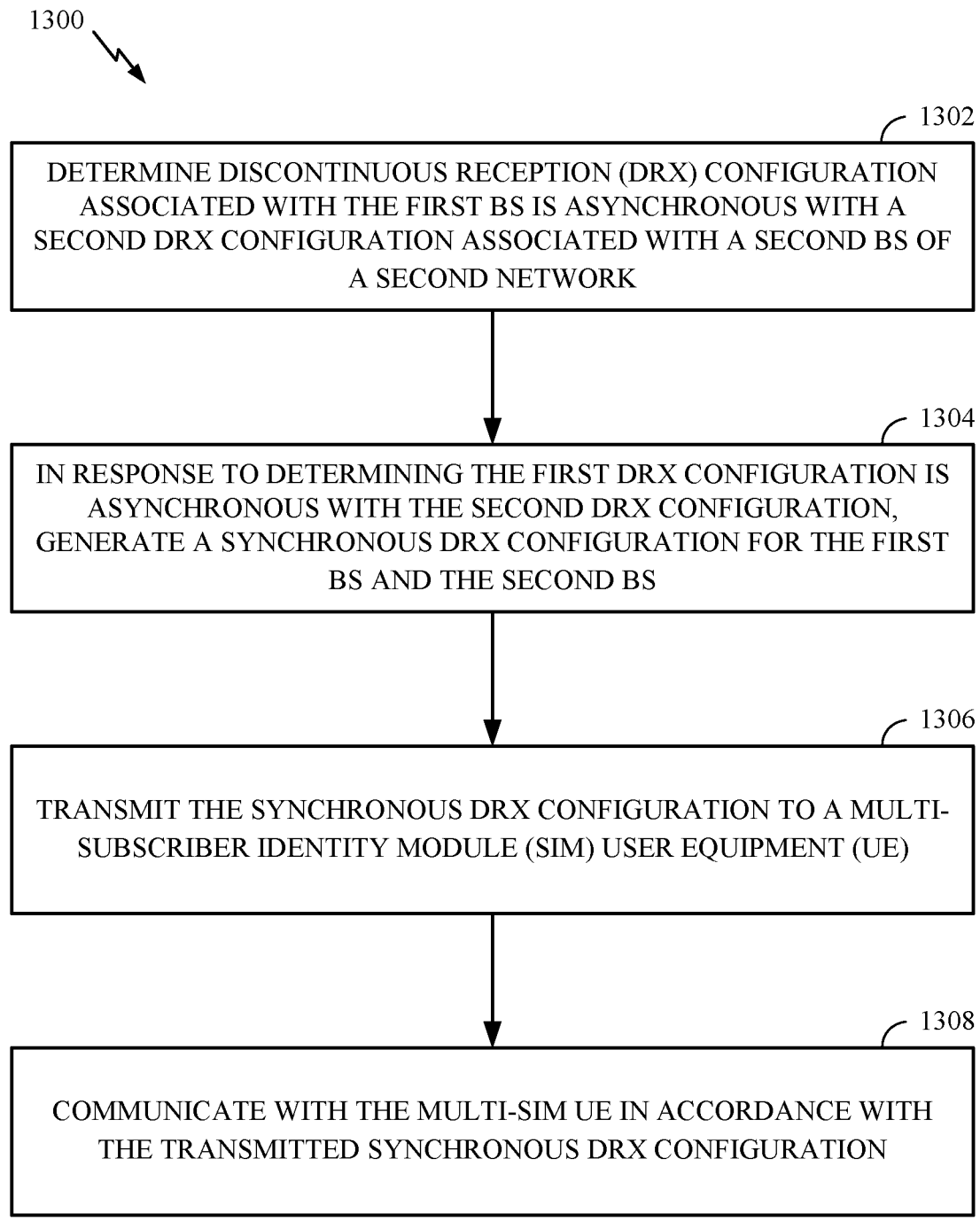
FIG. 13 is a flow diagram illustrating example operations for wireless communication by a BS, in accordance with certain aspects of the present disclosure.

FIG. 13 is a flow diagram illustrating example operations 1300 for wireless communication, in accordance with certain aspects of the present disclosure. The operations 1300 may be performed, for example, by a BS (e.g., such as the BS 110a in the wireless communication network 100). The operations 1300 may be implemented as software components that are executed and run on one or more processors (e.g., controller/processor 240 of FIG. 2). Further, the transmission and reception of signals by the BS in operations 1300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1300 may begin, at 1302, by a first BS determining a first DRX configuration associated with the first BS is asynchronous with a second DRX configuration associated with a second BS of a second network. Each DRX configuration may originate from the same multi-SIM UE. The first BS may comprise one of a 5G new radio (NR) BS or a 4G BS.

In some examples, the first BS may transmit the synchronous DRX configuration to the second BS via an Xn interface, and receive an acknowledgement of the synchronous DRX configuration from the second BS.

At 1304, in response to determining the first DRX configuration is asynchronous with the second DRX configuration, a first BS generates a synchronous DRX configuration for the first BS and the second BS. In some examples, the synchronous DRX configuration may comprises one or more of a DRX-inactivity timer, a DRX-ON-Timer, a DRX-LongCycle, DRX-ShortCycle, or a DRX-ShortCycleTimer as defined by DRX-Preference-r16 information illustrated in FIG. 7, consistent with DRX parameters described above. In 4G LTE, the DRX configuration may also comprise a delay budget report.

At 1306, the first BS transmits the synchronous DRX configuration to a multi-SIM UE. The synchronous DRX configuration may allow the multi-SIM UE to save power by maximizing the time a UE remains idle instead of monitoring a PDCCH.

At 1308, the first BS communicates with the multi-SIM UE in accordance with the transmitted synchronous DRX configuration. In some examples, the first BS may terminate use of the synchronous DRX configuration when the UE powers off or hands over from one of the first or second BSs to a third BS.

Figure 14:
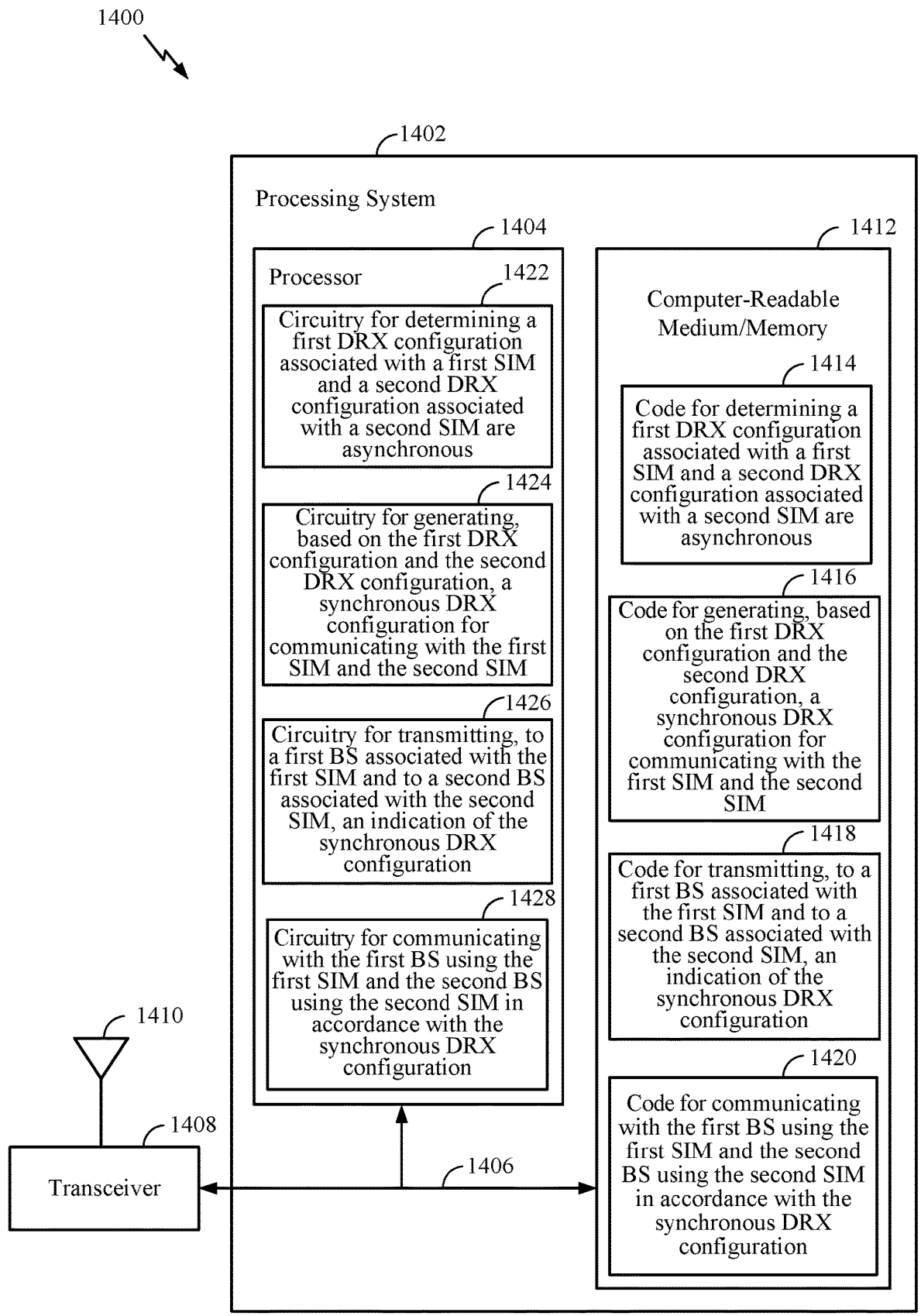
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 11. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 11, or other operations for performing the various techniques discussed herein for powering saving in a multi-SIM scenario. In certain aspects, computer-readable medium/memory 1412 stores code 1414 for determining a first DRX configuration associated with a first SIM and a second DRX configuration associated with a second SIM are asynchronous; code 1416 for generating, based on the first DRX configuration and the second DRX configuration, a synchronous DRX configuration for communicating with the first SIM and the second SIM; code 1418 for transmitting, to a first BS associated with the first SIM and to a second BS associated with the second SIM, an indication of the synchronous DRX configuration; and code 1420 for communicating with the first BS using the first SIM and the second BS using the second SIM in accordance with the synchronous DRX configuration.

In certain aspects, the processor 1404 has circuitry configured to implement the code stored in the computer-readable medium/memory 1412. The processor 1404 includes circuitry 1422 for determining a first DRX configuration associated with a first SIM and a second DRX configuration associated with a second SIM are asynchronous; circuitry 1424 for generating, based on the first DRX configuration and the second DRX configuration, a synchronous DRX configuration for communicating with the first SIM and the second SIM; circuitry 1426 for transmitting, to a first BS associated with the first SIM and to a second BS associated with the second SIM, an indication of the synchronous DRX configuration; and circuitry 1428 for communicating with the first BS using the first SIM and the second BS using the second SIM in accordance with the synchronous DRX configuration.

For example, means for transmitting (or means for outputting for transmission) may include a transmitter and/or an antenna(s) 234 or the BS 110a or the transmitter unit 254 and/or antenna(s) 252 of the UE 120a illustrated in FIG. 2 and/or circuitry 1426 for transmitting of the communication device 1400 in FIG. 14. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a or the receive processor 258, the transmit processor 264, the TX MIMO processor 266, and/or the controller/processor 280 of the UE 120a illustrated in FIG. 2 and/or the processing system 1402 of the communication device 1400 in FIG. 14.

Figure 15:
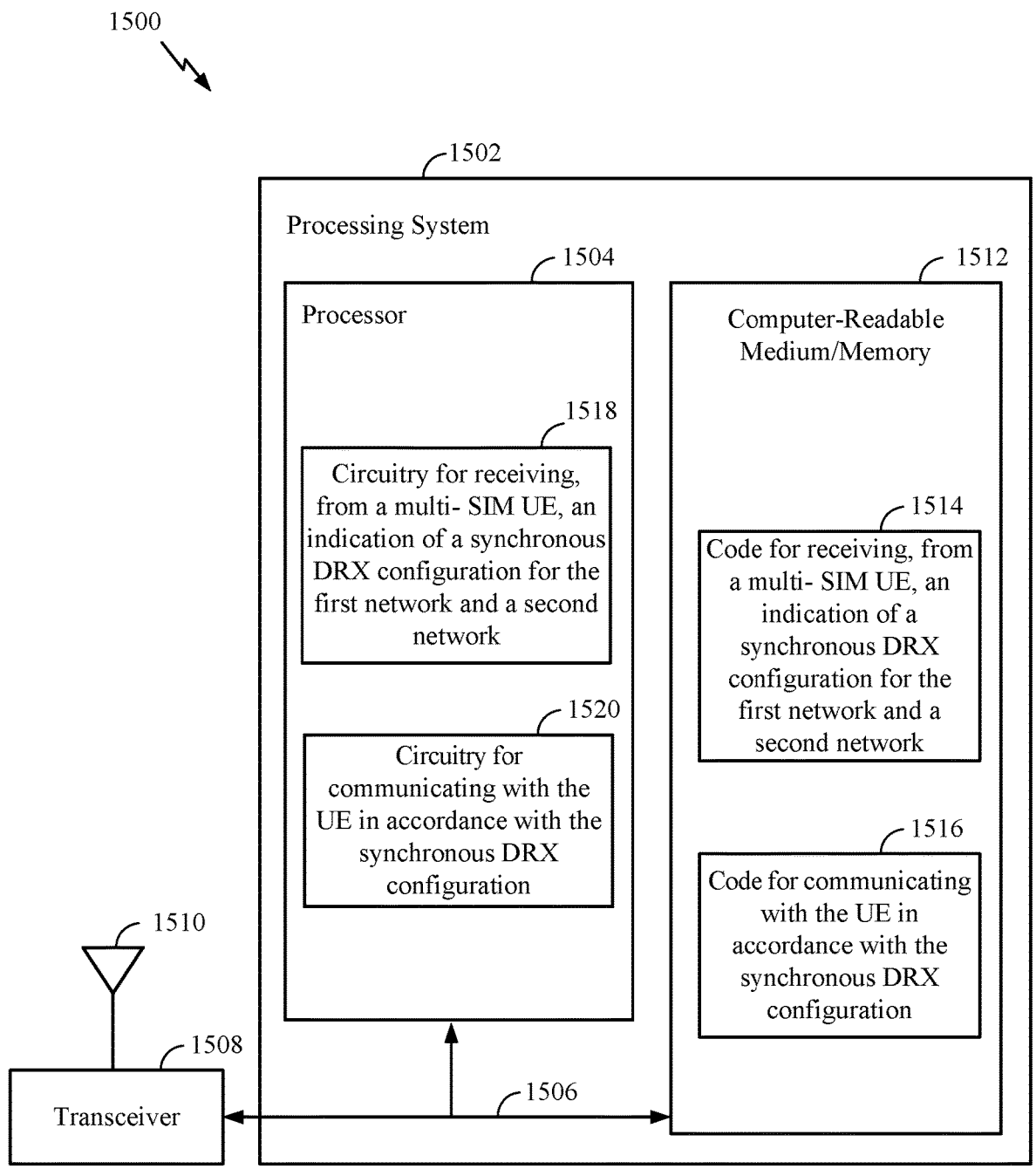
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 12. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 12, or other operations for performing the various techniques discussed herein for power saving in a multi-SIM scenario. In certain aspects, computer-readable medium/memory 1512 stores code 1514 for receiving, from a multi-SIM UE, an indication of a synchronous DRX configuration for the first network and a second network; and code 1516 for communicating with the UE in accordance with the synchronous DRX configuration. In certain aspects, the processor 1504 has circuitry configured to implement the code stored in the computer-readable medium/memory 1512. The processor 1504 includes circuitry 1518 for receiving, from a multi-SIM UE, an indication of a synchronous DRX configuration for the first network and a second network; and circuitry 1520 for communicating with the UE in accordance with the synchronous DRX configuration.

For example, means for receiving (or means for obtaining) may include a receiver and/or an antenna(s) 234 of the BS 110a or a receiver and/or antenna(s) 252 of the UE 120a illustrated in FIG. 2 and/or circuitry 1518 for receiving of the communication device 1500 in FIG. 15. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a or the receive processor 258, the transmit processor 264, the TX MIMO processor 266, and/or the controller/processor 280 of the UE 120a illustrated in FIG. 2 and/or the processing system 1502 of the communication device 1500 in FIG. 15.

Figure 16:
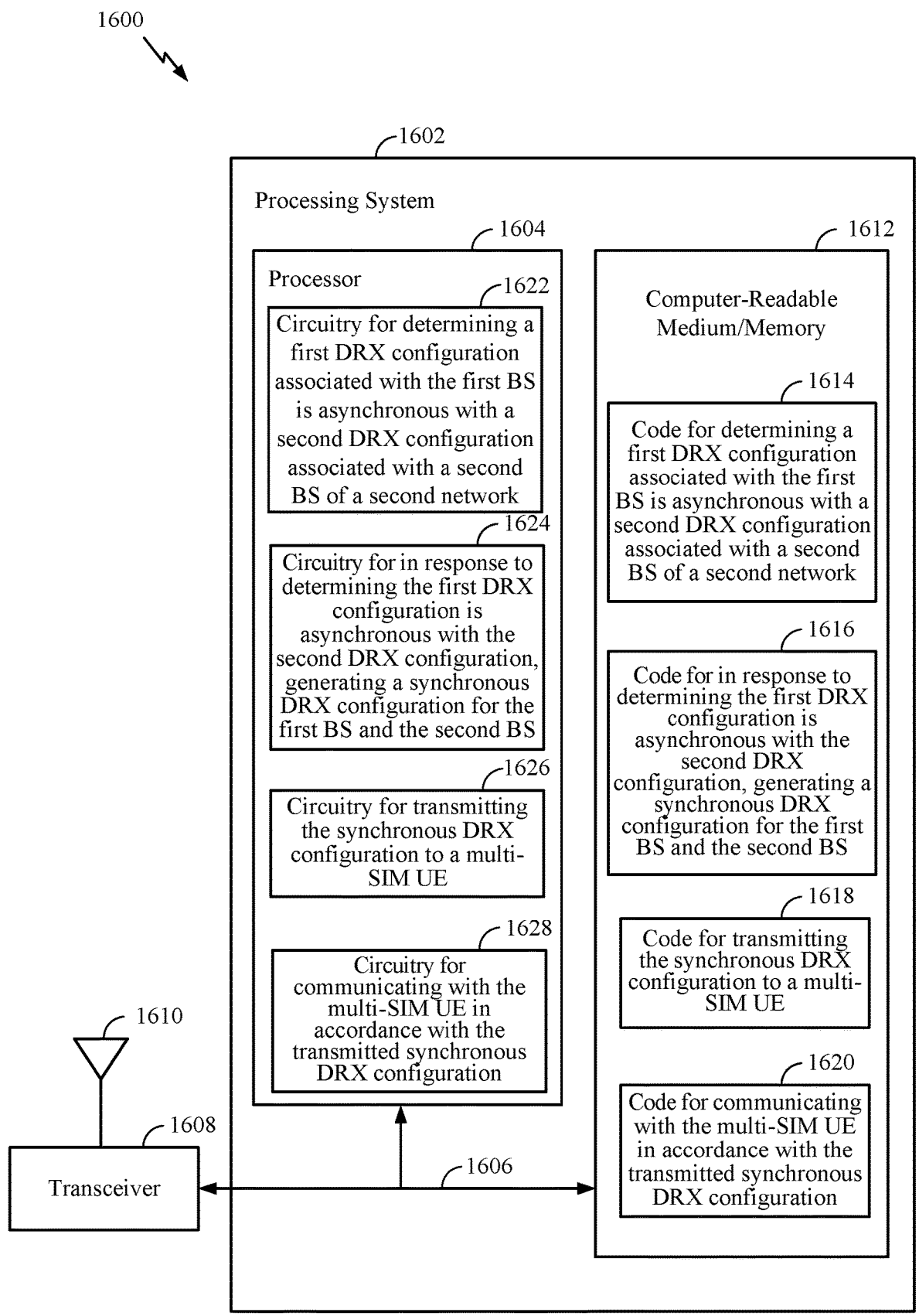
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 13. In aspects, the communication device 1500 illustrated in FIG. 15 includes the components 1600 illustrated in FIG. 16.

The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 13, or other operations for performing the various techniques discussed herein for power saving in a multi-SIM scenario. In certain aspects, computer-readable medium/memory 1612 stores code 1614 for determining a first DRX configuration associated with the first BS is asynchronous with a second DRX configuration associated with a second BS of a second network; code 1616 for in response to determining the first DRX configuration is asynchronous with the second DRX configuration, generating a synchronous DRX configuration for the first BS and the second BS, code 1618 for transmitting the synchronous DRX configuration to a multi-SIM UE; and code 1620 for communicating with the multi-SIM UE in accordance with the transmitted synchronous DRX configuration.

In certain aspects, the processor 1604 has circuitry configured to implement the code stored in the computer-readable medium/memory 1612. The processor 1604 includes circuitry 1622 for determining a first DRX configuration associated with the first BS is asynchronous with a second DRX configuration associated with a second BS of a second network; circuitry 1624 for in response to determining the first DRX configuration is asynchronous with the second DRX configuration, generating a synchronous DRX configuration for the first BS and the second BS; circuitry 1626 for transmitting the synchronous DRX configuration to a multi-SIM UE; and circuitry 1628 for communicating with the multi-SIM UE in accordance with the transmitted synchronous DRX configuration.

For example, means for transmitting (or means for outputting for transmission) may include a transmitter and/or an antenna(s) 234 or the BS 110a or the transmitter unit 254 and/or antenna(s) 252 of the UE 120a illustrated in FIG. 2 and/or circuitry 1626 for transmitting of the communication device 1600 in FIG. 16. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a or the receive processor 258, the transmit processor 264, the TX MIMO processor 266, and/or the controller/processor 280 of the UE 120a illustrated in FIG. 2 and/or the processing system 1602 of the communication device 1600 in FIG. 16.

EXAMPLE ASPECTS

Implementation examples are described in the following numbered clauses:

Aspect 1: A method for wireless communication comprising by a multi-subscriber identity module (SIM) user equipment (UE), comprising determining a first discontinuous reception (DRX) configuration associated with a first SIM and a second DRX configuration associated with a second SIM are asynchronous, generating, based on the first DRX configuration and the second DRX configuration, a synchronous DRX configuration for communicating with the first SIM and the second SIM, transmitting, to a first base station (BS) associated with the first SIM and to a second BS associated with the second SIM, an indication of the synchronous DRX configuration, and communicating with the first BS using the first SIM and the second BS using the second SIM in accordance with the synchronous DRX configuration.

Aspect 2: The method of aspect 1, wherein the synchronous DRX configuration comprises a same DRX-on timer and a same DRX-inactivity timer for the first SIM and the second SIM.

Aspect 3: The method of any of aspects 1 and 2, furthering comprising receiving, from the first B S, the first DRX configuration, and receiving, from the second BS, the second DRX configuration.

Aspect 4: The method of any of aspects 1-3, wherein the indication of the synchronous DRX configuration comprises, one or more of a DRX-inactivity timer, a DRX-ON-Timer, a DRX-LongCycle, DRX-ShortCycle, or a DRX-ShortCycleTimer.

Aspect 5: The method of any of aspects 1-4, wherein the indication of the synchronous DRX configuration comprises a delay budget report.

Aspect 6: The method of any of aspects 1-5, further comprising, receiving, from the first BS, a first acknowledgment of the transmitted synchronous DRX configuration, and receiving, from the second BS, a second acknowledgment of the transmitted synchronous DRX configuration.

Aspect 7: The method of any of aspects 1-6, wherein the first BS comprises one of a 5G new radio (NR) BS or a 4G BS.

Aspect 8: The method of any of aspects 1-6, further comprising terminating use of the synchronous DRX configuration when the UE powers off or hands over from one of the first or second BSs to a third BS.

Aspect 9: A method for wireless communication by a base station (BS) associated with a first network, comprising receiving, from a multi-subscriber identity module (SIM) user equipment (UE), an indication of a synchronous discontinuous reception (DRX) configuration for the first network and a second network and communicating with the UE in accordance with the synchronous DRX configuration.

Aspect 10: The method of aspect 9, furthering comprising transmitting an acknowledgement of the synchronous DRX configuration in response to receiving the indication of the synchronous DRX configuration from the UE.

Aspect 11: The method of any of aspects 9 and 10, wherein the indication of the synchronous DRX configuration comprises one or more of a DRX-inactivity timer, a DRX-ON-Timer, a DRX-LongCycle, DRX-ShortCycle, or a DRX-ShortCycleTimer.

Aspect 12: The method of any of aspects 9-11, wherein the indication of the synchronous DRX configuration comprises a delay budget report.

Aspect 13: The method of any of aspects 9-12, wherein the BS comprises one of a 5G new radio (NR) BS or a 4G BS.

Aspect 14: The method of any of aspects 9-13, further comprising, terminating use of the synchronous DRX configuration when the UE powers off or hands over from the BS to a second BS.

Aspect 15: A method for wireless communication by a first base station (BS) of a first network, comprising determining a first discontinuous reception (DRX) configuration associated with the first BS is asynchronous with a second DRX configuration associated with a second BS of a second network, in response to determining the first DRX configuration is asynchronous with the second DRX configuration, generating a synchronous DRX configuration for the first BS and the second BS, transmitting the synchronous DRX configuration to a multi-subscriber identity module (SIM) user equipment (UE), and communicating with the multi-SIM UE in accordance with the transmitted synchronous DRX configuration.

Aspect 16: The method of aspect 15, further comprising, transmitting the synchronous DRX configuration to the second BS via an Xn interface, and receiving an acknowledgement of the synchronous DRX configuration from the second BS.

Aspect 17: The method of any of aspects 15 and 16, wherein the synchronous DRX configuration comprises one or more of a DRX-inactivity timer, a DRX-ON-Timer, a DRX-LongCycle, DRX-ShortCycle, or a DRX-ShortCycleTimer.

Aspect 18: The method of any of aspects 15-17, wherein the synchronous DRX configuration comprises a delay budget report.

Aspect 19: The method of any of aspects 15-18, wherein the first BS comprises one of a 5G new radio (NR) BS or a 4G BS.

Aspect 20: The method of any of aspects 15-19, further comprising terminating use of the synchronous DRX configuration when the UE powers off or hands over from one of the first or second BSs to a third BS.

Aspect 21: An apparatus comprising means for performing the method of any of aspects 1 through 20.

Aspect 22: An apparatus comprising at least one processor and a memory coupled to the at least one processor, the memory comprising code executable by the at least one processor to cause the apparatus to perform the method of any of aspects 1 through 20.

Aspect 23: A computer readable medium storing computer executable code thereon for wireless communications that, when executed by at least one processor, cause an apparatus to perform the method of any of aspects 1 through 20.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 11, 12, and 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a multi-subscriber identity module (SIM) user equipment (UE), comprising:
   determining a first discontinuous reception (DRX) configuration associated with a first SIM and a second DRX configuration associated with a second SIM are asynchronous;
   generating, based on the first DRX configuration and the second DRX configuration, a synchronous DRX configuration for communicating with the first SIM and the second SIM;
   transmitting, to a first base station (BS) associated with the first SIM and to a second BS associated with the second SIM, an indication of the synchronous DRX configuration; and
   communicating with the first BS using the first SIM and the second BS using the second SIM in accordance with the synchronous DRX configuration.

2. The method of claim 1, wherein the synchronous DRX configuration comprises a same DRX-on timer and a same DRX-inactivity timer for the first SIM and the second SIM.

3. The method of claim 1, furthering comprising:
receiving, from the first B S, the first DRX configuration; and
receiving, from the second BS, the second DRX configuration.

4. The method of claim 1, wherein the indication of the synchronous DRX configuration comprises:
one or more of a DRX-inactivity timer, a DRX-ON-Timer, a DRX-LongCycle, DRX-ShortCycle, or a DRX-ShortCycleTimer.

5. The method of claim 1, wherein the indication of the synchronous DRX configuration comprises a delay budget report.

6. The method of claim 1, further comprising:
receiving, from the first BS, a first acknowledgment of the transmitted synchronous DRX configuration; and
receiving, from the second BS, a second acknowledgment of the transmitted synchronous DRX configuration.

7. The method of claim 1, wherein the first BS comprises one of a 5G new radio (NR) BS or a 4G BS.

8. The method of claim 1, further comprising:
terminating use of the synchronous DRX configuration when the UE powers off or hands over from one of the first or second BSs to a third BS.

9. A method for wireless communication by a base station (BS) associated with a first network, comprising:
receiving, from a multi-subscriber identity module (SIM) user equipment (UE), an indication of a synchronous discontinuous reception (DRX) configuration for the first network and a second network; and
communicating with the UE in accordance with the synchronous DRX configuration.

10. The method of claim 9, furthering comprising:
transmitting an acknowledgement of the synchronous DRX configuration in response to receiving the indication of the synchronous DRX configuration from the UE.

11. The method of claim 9, wherein the indication of the synchronous DRX configuration comprises:
one or more of a DRX-inactivity timer, a DRX-ON-Timer, a DRX-LongCycle, DRX-ShortCycle, or a DRX-ShortCycleTimer.

12. The method of claim 9, wherein the indication of the synchronous DRX configuration comprises a delay budget report.

13. The method of claim 9, wherein the BS comprises one of a 5G new radio (NR) BS or a 4GBS.

14. The method of claim 9, further comprising:
terminating use of the synchronous DRX configuration when the UE powers off or hands over from the BS to a second BS.

15. A method for wireless communication by a first base station (BS) of a first network, comprising:
determining a first discontinuous reception (DRX) configuration associated with the first BS is asynchronous with a second DRX configuration associated with a second BS of a second network;
in response to determining the first DRX configuration is asynchronous with the second DRX configuration, generating a synchronous DRX configuration for the first BS and the second BS;
transmitting the synchronous DRX configuration to a multi-subscriber identity module (SIM) user equipment (UE); and
communicating with the multi-SIM UE in accordance with the transmitted synchronous DRX configuration.

16. The method of claim 15, further comprising:
transmitting the synchronous DRX configuration to the second BS via an Xn interface; and
receiving an acknowledgement of the synchronous DRX configuration from the second BS.

17. The method of claim 15, wherein the synchronous DRX configuration comprises:
one or more of a DRX-inactivity timer, a DRX-ON-Timer, a DRX-LongCycle, DRX-ShortCycle, or a DRX-ShortCycleTimer.

18. The method of claim 15, wherein the synchronous DRX configuration comprises a delay budget report.

19. The method of claim 15, wherein the first BS comprises one of a 5G new radio (NR) BS or a 4G BS.

20. The method of claim 15, further comprising:
terminating use of the synchronous DRX configuration when the UE powers off or hands over from one of the first or second BSs to a third BS.

21. An apparatus for wireless communication, comprising:
at least one processor; and
a memory coupled to the at least one processor, the memory comprising code executable by the at least one processor to cause the apparatus to:
determine a first discontinuous reception (DRX) configuration associated with a first SIM and a second DRX configuration associated with a second SIM are asynchronous;
generate, based on the first DRX configuration and the second DRX configuration, a synchronous DRX configuration for communicating with the first SIM and the second SIM;
transmit, to a first base station (BS) associated with the first SIM and to a second BS associated with the second SIM, an indication of the synchronous DRX configuration; and
communicate with the first BS using the first SIM and the second BS using the second SIM in accordance with the synchronous DRX configuration.

22. The apparatus of claim 21, wherein the synchronous DRX configuration comprises a same DRX-on timer and a same DRX-inactivity timer for the first SIM and the second SIM.

23. The apparatus of claim 21, furthering comprising:
code executable by the at least one processor to cause the apparatus to:
receive, from the first BS, the first DRX configuration; and
receive, from the second BS, the second DRX configuration.

24. The apparatus of claim 21, wherein the indication of the synchronous DRX configuration comprises:
one or more of a DRX-inactivity timer, a DRX-ON-Timer, a DRX-LongCycle, DRX-ShortCycle, or a DRX-ShortCycleTimer.

25. The apparatus of claim 21, wherein the indication of the synchronous DRX configuration comprises a delay budget report.

26. The apparatus of claim 21, further comprising code executable by the at least one processor to cause the apparatus to:
receive, from the first BS, a first acknowledgment of the transmitted synchronous DRX configuration; and
receive, from the second BS, a second acknowledgment of the transmitted synchronous DRX configuration.

27. The apparatus of claim 21, wherein the first BS comprises one of a 5G new radio (NR) BS or a 4G BS.

28. The apparatus of claim 21, further comprising code executable by the at least one processor to cause the apparatus to:
- terminate use of the synchronous DRX configuration when the UE powers off or hands over from one of the first or second BSs to a third BS.

\* \* \* \* \*